United States Patent [19]

Berger

[11] 4,296,223
[45] Oct. 20, 1981

[54] POLYMERIZATION OF OLEFINS
[75] Inventor: Eugene Berger, Brussels, Belgium
[73] Assignee: Solvay & Cie, Brussels, Belgium
[21] Appl. No.: 195,093
[22] Filed: Oct. 8, 1980

Related U.S. Application Data

[63] Continuation of Ser. No. 658,682, Feb. 17, 1976, abandoned, which is a continuation of Ser. No. 372,073, Jun. 21, 1973, abandoned.

[30] Foreign Application Priority Data

Jun. 22, 1972 [LU] Luxembourg ............................ 65587

[51] Int. Cl.³ .......................... C08F 4/02; C08F 10/02
[52] U.S. Cl. ................................ 526/125; 252/429 R; 252/429 C; 526/114; 526/115; 526/122; 526/151; 526/352
[58] Field of Search ...................... 252/429 R, 429 C; 526/125

[56] References Cited

U.S. PATENT DOCUMENTS

| 3,326,877 | 6/1967 | Orzechowski et al. | 526/124 |
|---|---|---|---|
| 3,400,110 | 9/1968 | Danesse et al. | 526/124 |
| 3,450,682 | 6/1969 | Sasaki et al. | 526/122 |
| 3,479,329 | 11/1969 | Chauvin et al. | 526/116 |
| 3,526,616 | 9/1970 | Delbouille et al. | 526/124 |
| 3,535,299 | 10/1970 | Danesse et al. | 526/115 |
| 3,634,384 | 1/1972 | Susa et al. | 526/124 |
| 3,642,746 | 2/1972 | Kashiwa et al. | 526/125 |
| 3,642,760 | 2/1972 | Backelmans et al. | 526/124 |
| 3,644,318 | 2/1972 | Diedrich et al. | 526/124 |
| 3,658,722 | 4/1972 | Delbouille et al. | 526/124 |
| 3,676,414 | 7/1972 | Diedrich et al. | 526/125 |
| 3,718,636 | 2/1973 | Stevens et al. | 526/124 |
| 3,789,036 | 1/1974 | Longi et al. | 526/125 |
| 3,803,105 | 4/1974 | Galli et al. | 526/125 |
| 3,819,599 | 6/1974 | Fotis et al. | 526/124 |
| 3,830,787 | 8/1974 | Susa et al. | 526/125 |
| 3,833,515 | 9/1974 | Amtmann et al. | 526/124 |
| 3,901,863 | 8/1975 | Berger et al. | 526/124 |

FOREIGN PATENT DOCUMENTS 1958488  5/1970  Fed. Rep. of Germany .
2013730 10/1970  Fed. Rep. of Germany .
1964186  6/1971  Fed. Rep. of Germany .

Primary Examiner—Edward J. Smith

[57] ABSTRACT

The present invention comprises a catalyst system, catalyst complex, and a process for the polymerization and copolymerization of alpha-olefins in which the process is carried out in the presence of a catalyst system comprising an organic compound of a metal of Group Ib, IIa, IIIb, or IVb of the Periodic Table and a solid catalyst complex prepared by reacting a divalent metal halide, an organic oxygen compound of a metal of Group IVa, Va, or VIa of the Periodic Table, and an aluminum halide.

17 Claims, No Drawings

POLYMERIZATION OF OLEFINS

This is a continuation of application Ser. No. 658,682, filed Feb. 17, 1976 which in turn is a continuation of Ser. No. 372,073, filed June 21, 1973, now abandoned, both incorporated by reference.

BACKGROUND OF THE INVENTION

For the low pressure polymerization of olefins, it is known to use catalyst systems comprising a transition metal compound and an organometallic compound.

It is also known from Belgian Pat. No. 650,679 to use, as the transition metal compound of the catalyst systems mentioned above, a solid obtained by reacting a transition metal compound with a divalent metal hydroxychloride such as Mg(OH)Cl.

Catalyst systems are also described in Belgian Pat. No. 730,068, in which one of the constituents is also the product of the reaction between a transition metal compound and a solid support consisting of a hydroxylic and/or hydrated divalent metal halide.

Catalyst systems of the same species are described in French patent application Ser. No. 2,014,887, wherein the product of the reaction of a halogen compound of a transition metal with a divalent metal halide complexed by means of an electron donor is employed.

The catalyst systems described in the patents mentioned above are more active than the catalyst systems wherein the transition metal compound is employed directly. However, their activity is still inadequate because the polyolefins produced by means of these systems possess concentrations of catalyst residues which are too high for certain applications.

SUMMARY OF THE INVENTION

Catalyst complexes have now been found which are also prepared from divalent metal halides but which possess much higher activities than those of the catalyst constituents belonging to the prior art.

The present invention comprises a catalyst system, catalyst complexes, and a process for the polymerization and copolymerization of alpha-olefins in which the process is carried out in the presence of a catalyst system comprising an organic compound of a metal from Groups IB, IIa, IIb, IIIb, and IVb of the Periodic Table and a solid catalyst complex prepared by reacting:
(1) a divalent metal halide,
(2) an organic oxygen-compound of a metal of Groups IVa, Va and VIa of the Periodic Table, and
(3) an aluminum halide.

DETAILED DESCRIPTION

With respect to the catalyst complex, the divalent metal halide (1) used can be of any metals which can have a valency of two. It is, however, preferred to use magnesium, calcium, zinc, manganese, iron, nickel, cobalt and tin halides. The best results are obtained with magnesium halides.

The term "divalent metal halide" as used herein, is meant to encompass all the compounds of the divalent metal which possess bonds between the divalent metal and a halogen, in their molecule. This halogen can be fluorine, chlorine, bromine or iodine. The halogen is preferably chlorine, bromine or iodine. The best results are obtained when the halogen is chlorine.

Divalent metal halides corresponding to an overall formula such that they contain at least 0.5 divalent metal-halogen bond per divalent metal atom are preferably used. The best results are obtained with halides containing one or more of these bonds per divalent metal atom.

Examples of divalent metal halides which give good results are dihalides such as $MgF_2$, $MgCl_2$, $MgBr_2$, $MgI_2$, $CaCl_2$, $ZnCl_2$, $MnCl_2$, $FeCl_2$, $NiCl_2$, $CoCl_2$ and $SnCl_2$.

In addition to the divalent metal-halogen bonds, the divalent metal halides which can be used can contain bonds to other groups. These groups may be of any type. By way of examples, there may be mentioned: the hydroxyl group as in $Mg(OH)Cl$, $Mg(OH)Br$ and $Mn(OH)Cl$; alkoxy groups as in $Mg(OC_2H_5)Cl$; alkyl groups as in $Mg(C_2H_5)Cl$, phenoxy groups as in $Mg(OC_6H_5)Cl$; and aromatic groups as in $Mg(C_6H_5)Cl$.

The use of divalent metal halide hydrates also lies within the scope of the present invention. Within this category of compounds, there may be mentioned very particularly dihalide hydrates such as $MgCl_2.6H_2O$, $MgCl_2.4H_2O$, $MgCl_2.2H_2O$, $MgCl_2.H_2O$, $MgBr_2.6H_2O$, $MgBr_2.H_2O$, $MgI_2.8H_2O$ and $MgI_2.6H_2O$. The divalent metal dihalides of the commercial variety which are conventionally called "anhydrous", but which are in fact dihalide hydrates containing 1 molecule or less of water per molecule of divalent metal dihalide, also fall within this category; "commercial anhydrous" magnesium dichlorides are a typical example of these compounds. Furthermore, it is to be understood that the use of the products of hydrolysis of divalent metal halide hydrates also falls within the scope of the invention insofar as these products still contain divalent metal-halogen bonds.

Within the scope of the present invention, it is also possible to use divalent metal halide which are complexed by means of various electron donors. By way of examples, there may be mentioned the complexes with ammonia such as $MgCl_2.6NH_3$, $MgCl_2.2NH_3$, $MgCl_2.NH_3$, $MgBr_2.6NH_3$, $MgBr_2.2NH_3$, $MgBr_2.NH_3$, $MgI_2.6NH_3$ and $MgI_2.NH_3$; hydroxylamine such as $MgCl_2.2NH_2OH.2H_2O$; alcohols such as $MgCl_2.6CH_3OH$, $MgCl_2.6C_2H_5OH$, $MgCl_2.6C_3H_7OH$, $MgCl_2.6C_4H_9OH$, $MgBr_2.6CH_3OH$, $MgBr_2.6C_2H_5OH$, $MgBr_2.6C_3H_7OH$ and $MgI_2.6CH_3OH$; ethers such as $MgCl_2.(C_2H_5)_2O$ and $MgBr_2.(C_2H_5)_2O$; carboxylic acids such as $MgCl_2.6CH_3CO_2H$, $MgCl_2.4CH_3CO_2H$, $MgBr_2.6CH_3CO_2H$ and $MgI_2.6C_2H_5CO_2H$; esters such as $MgCl_2.2CH_3CO_2C_2H_5$, $MgBr_2.2C_6H_5CO_2C_2H_5$ and $MgI_2.6CH_3CO_2C_2H_5$; acid chlorides such as $MgBr_2.CH_3COCl$; amides such as $MgBr_2.4CO(NH_2)_2$ and $MgI_2.6CH_3CONH_2$; nitriles such as $MgBr_2.4CH_3CN$; amines such as $MgCl_2.3C_2H_4(NH_2)_2$, $MgCl_2.2N(C_2H_4OH)_3$, $MgCl_2.2C_6H_5NH_2.6H_2O$ and $MgBr_2.6C_6H_5NH_2$; and heterocyclic derivatives such as the complexes of $MgCl_2$, $MgBr_2$ and $MgI_2$ with dioxane and pyridine.

It is possible to use mixed compositions containing divalent metal halides. Typical examples of these compositions are basic halides of magnesium such as $MgCl_2.MgO.H_2O$, $MgCl_2.3MgO.7H_2O$ and $MgBr_2.3MgO.6H_2O$.

Finally, the use of several different divalent metal halides also falls within the scope of the present invention.

As the organic oxygen-compound of a metal from Groups IVa, Va and VIa of the Periodic Table (2) used in forming the catalyst complex, it is preferred to use organic oxygen-compounds of titanium, zirconium and vanadium. The best results are obtained with organic oxygen-compounds of titanium.

By "organic oxygen-compound", there are to be included all the compounds wherein an organic radical is bonded to the metal via oxygen. Compounds containing radicals other than organic radicals bonded to the metal via oxygen, and in particular compounds containing halide radicals (fluoride, chloride, bromide or iodide), are excluded from the scope of the present invention. However, compounds containing metal-oxygen bonds and condensed compounds containing sequences of metal-oxygen-bonds can also be used provided that they also contain at least one metal-oxygen-organic radical bond sequence per molecule.

The organic radicals bonded to the metal via oxygen can be of any type. They generally contain 1 to 20 carbon atoms and preferably 1 to 10 carbon atoms. The best results are obtained when they contain 1 to 6 carbon atoms. These organic radicals are preferably chosen from among hydrocarbon radicals and in particular from among alkyl radicals (linear or branched), cycloalkyl radicals, aralkyl radicals, aryl radicals and alkaryl radicals.

It is possible to represent these organic oxygen-compounds by the general formula $[TO_x(OR)_y]_m$ wherein T is a metal from Groups IVa, Va and VIa of the Periodic Table, R is an organic radical as defined above, x and y are numbers such that $x \geq 0$ and $y > 0$, and are compatible with the valency of the metal T, and m is an integer. It is preferred to use organic oxygen-compounds wherein x is such that $0 \leq x \leq 1$ and m is such that $1 \leq m \leq 6$.

Among the organic oxygen-compounds which can be used within the scope of the present invention, there may be mentioned: alkoxides such as $Ti(OC_3H_7)_4$, $Ti(OC_4H_9)_4$, $V(OC_3H_7)_4$ and $Zr(OC_3H_7)_4$; phenoxides such as $Ti(OC_6H_5)_4$; oxyalkoxides such as $VO(OC_3H_7)_3$; condensed alkoxides such as $Ti_2O(OC_3H_7)_6$; and enolates such as titanium acetylacetonate.

The use of organic oxygen-compounds containing several different organic radicals also falls within the scope of the present invention. The same applies to the use of several different organic oxygen-compounds of one and the same metal and to the use of several organic oxygen-compounds of different metals.

The third essential reagent used to prepare the catalyst complexes according to the invention must be an aluminum halide (3). It is preferably chosen from among the aluminum halides of the general formula $AlR'_nX_{3-n}$ in which R' is a hydrocarbon radical containing 1 to 20 carbon atoms and preferably 1 to 6 carbon atoms, X is a halogen (fluorine, chlorine, bromine or iodine) and n is any number such that $0 \leq n < 3$. R' is preferably chosen from among alkyl radicals (linear or branched), cycloalkyl radicals, aralkyl radicals, aryl radicals and alkylaryl radicals. The best results are obtained when X represents chlorine and n is such that $0 \leq n \leq 2$ and preferably such that $1 \leq n \leq 2$.

By way of examples of aluminum halides which can be used in the invention, there may be mentioned: $AlCl_3$, $Al(C_2H_5)Cl_2$, $Al_2(C_2H_5)_3Cl_3$ and $Al(C_2H_5)_2Cl$.

It is also possible to use several different aluminum halides.

A particularly advantageous embodiment of the invention consists of employing a fourth reagent consisting of an organic oxygen-compound of a metal from Groups IIIb and IVb of the Periodic Table (4) in addition to the three reagents mentioned above, in order to prepare the catalyst complexes. For this embodiment, an organic oxygen-compound of aluminum or of silicon is preferably used. The best results are obtained with organic oxygen-compounds of aluminum. For the remainder, the organic oxygen-compounds which can be used as this fourth reagent agree in all respects with the definitions and limitations listed above in relation to the reagent (2) which is an organic oxygen-compound of a metal of Groups IVa, Va and VIa of the Periodic Table. Examples of organic oxygen-compounds which can be used as the fourth reagent are $Al(OC_3H_7)_3$ and $Si(OC_4H_9)_4$.

In order to carry out the complex formation reaction, the reagents can be employed in the solid form, for example, suspended in an inert diluent or in the form of dry particles, in the liquid form, when the working conditions permit it, in the form of a solution or in the form of a vapor or gas.

It is preferred to carry out the complex formation reaction in a liquid medium. To do this, it is possible to work in the presence of a diluent. In this case, a diluent in which at least one of the reagents is soluble is preferably chosen; often, the organic oxygen-compound reagent (2) is readily soluble. Any solvents usually employed in organic chemistry can be used. It is, however, preferred to use alkanes and cycloalkanes in which the molecule contains 4 to 20 carbon atoms, such as isobutane, normal pentane, normal hexane, cyclohexane, methylcyclohexane and dodecanes. It is also possible to use alcohols in which the molecule contains 1 to 12 carbon atoms per hydroxyl groups, such as ethanol, butanol and cyclohexanol. When a diluent is used, it is preferred that the total concentration of the dissolved reagent or reagents be greater than 5% by weight and preferably greater than 20% by weight relative to the diluent.

It is also possible to carry out the reaction in a liquid medium in the absence of a diluent, and this forms a preferential embodiment of the invention, by choosing conditions of temperature and pressures such that at least one of the reagents is in the liquid state. Often, the organic oxygen-compound reagent (2) is in the liquid state under relatively mild conditions of temperature and pressure. When this reagent (2) is not liquid or is not used in sufficient amount, it is nevertheless possible to dispense with a diluent if the optional organic oxygen-compound reagent (4) which is liquid is used.

The temperature at which the reaction is carried out is not critical. It is generally chosen in such a way that one of the reagents is liquid or is dissolved in the diluent. For reasons of convenience, it is preferred to work between 20° and 300° C. and, more particularly, between 50° and 200° C. The pressure is not critical either. The reaction is generally carried out at about atmospheric pressure. In order to promote homogeneity of the reaction mixture, the latter is generally stirred during the duration of the reaction. The reaction can be carried out continuously or discontinuously.

The reagents can be added in any order whatsoever. It is, however, preferred to carry out the reaction in accordance with one of the following methods: (1) the reagent (1) and the reagent (2) are brought into contact by mixing them gradually or by adding them to one another; where appropriate, the reagent (4) is added in the same way; the reagent (3) is then added gradually; (2) the reagent (2) and the reagent (3) are mixed, preferably rapidly, and then the reagent (1) is added; or (3) all the reagents are mixed simultaneously and gradually.

The rate at which the reagents are added is not critical either. It is generally chosen in such a way as not to cause rapid heating of the reaction mixture due to the reaction possibly becoming violent.

The amounts of reagents which are preferably to be employed are defined below.

The amount of reagent (2) (organic oxygen-compound of a metal T from Groups IVa, Va and VIa) is defined relative to the amount of the halide of the divalent metal M employed. It can vary widely. In general, it is between 0.01 and 100 gram atom of metal T present in the organic oxygen-compound per gram atom of metal M present in the halide. It has been observed that the performance of the catalyst complexes (yield and specific activity) is highest when the atomic ratio T/M is between 0.025 and 5 gram atom/gram atom. The best results are obtained when this ratio varies between 0.05 and 2.5 gram atom/gram atom.

When the variant of the invention is used according to which a reagent (4) (organic oxygen-compound of a metal B from Groups IIIb and IVb) is employed, the amounts of this reagent to be used are such that the ratio between the amount of metal B and the amount of metal T present in the reagent (2) is between 0.01 and 100 gram atom/gram atom. The atomic ratio B/T is preferably between 0.1 and 50 gram atom/gram atom. The best results are obtained when it varies between 1 and 20 gram atom/gram atom.

The amount of reagent (3) (aluminum halide) to be employed is calculated relative to the amount of reagent (2) and, where appropriate, of reagent (4), employed. It can also vary to a large extent. In general, it is between 0.1 and 10 mols of aluminum halide per gram equivalent of metal T present in the organic oxygen-compound of a metal from Groups IVa, Va and VIa and of metal B present in the organic oxygen-compound of a metal from Groups IIIb and IVb. By gram equivalent, there is to be understood the weight in grams of these metals which is capable of reacting with or of replacing one gram atom of hydrogen. This amount is preferably between 0.25 and 2.5 mols per gram equivalent. The best results are obtained when it is between 0.5 and 1.5 mol per gram equivalent.

The catalyst complexes prepared according to the invention are solids. They are insoluble in the alkanes and the cycloalkanes which can be used as diluents. They can be used in polymerization just as they are obtained, without being isolated from the reaction mixture. It is, however, preferred to isolate them from this reaction mixture according to any process of isolation whatsoever. When the reaction mixture is liquid, it is possible, for example, to use filtration, decanting or centrifuging.

Isolation of the catalyst complexes from the reaction mixture achieves advantages which do not apply when they are used just as they are obtained.

In effect, this isolation makes it possible firstly to remove the unconsumed reagents, the presence of which can cause a considerable decrease in the catalytic activity, given that these reagents are very unproductive.

Secondly, the use of these catalyst complexes in the solid state, when they have been isolated from the reaction mixture, makes it possible to obtain polymers with a more uniform structure, probably due to a better-oriented incorporation of the monomer units into the growing polymer chains, during the propagation step.

Furthermore, the isolation of the catalyst complexes from the reaction mixture leads to a considerable decrease in the proportion of fine particles present in the polymerization mixture, and this has the effect of considerably improving the morphology of the polymer. During the polymerization, no formation of downy or fluffy polymer, which is very unfavorable for transportation, storage and use, is observed. Moreover, when the reagent (1) (divalent metal halide) used to prepare the catalyst complexes according to the invention is a solid, it is preferred to use a solid in which the particles are of uniform shape and the particle size of which falls within a very narrow range. In fact, a parallel effect is observed between the morphology of the solid catalyst complex and that of the polymer, which thus makes it possible to exert control over the latter.

Finally, this isolation is absolutely necessary when the polymerization of the olefins is carried out in the monomer or one of the monomers, kept in the liquid state or in the gaseous phase.

After they have been isolated, the catalyst complexes can be washed so as to remove the excess reagents with which they may still be impregnated. Any inert diluent whatsoever can be used for this washing, for example, those which can be used as constituents of the reaction mixture such as alkanes and cycloalkanes. After washing, the catalyst complexes can be dried, for example, by blowing a stream of dry nitrogen over them or in vacuo.

The mechanism of the reaction whereby the catalyst complexes of the invention are formed is not known. Elementary analysis of these complexes, after they have been isolated and washed, above that chemically bonded complexes are involved, the products of chemical reactions are not the result of mixing or adsorption phenomena. In effect, it is impossible to dissociate one or the other of the reagents or the constituents of these complexes by using purely physical methods of separation.

The catalyst complexes of the invention, the exact nature of which is also not well known, contain divalent metal, metal from Groups IVa, Va and VIa, where appropriate metal from Groups IIIb and IVb, aluminum and halogen in variable amounts.

The catalyst systems according to the invention also contain an organic compound which serves as an activator. Organic derivatives of metals from Groups Ib, Ia, IIa, IIb, IIIb and IVb of the Periodic Table are used, such as organic compounds of lithium, magnesium, zinc, aluminum or tin. The best results are obtained with organic compounds of aluminum.

Completely alkylated compounds, in which the alkyl chains contain 1 to 20 carbon atoms and are straight or branched, can be used, such as, for example, n-butyl-lithium, diethylmagnesium, diethyl-zinc, trimethyl-aluminum, triethyl-aluminum, triisobutyl-aluminum, tri-n-butyl-aluminum, tri-n-decyl-aluminum, tetraethyl-tin and tetrabutyl-tin. It is, however, preferred to use trialkyl-aluminums in which the alkyl chains contain 1 to 10 carbon atoms and are straight or branched.

It is also possible to use alkyl-metal hydrides in which the alkyl radicals also contain 1 to 20 carbon atoms, such as diisobutyl-aluminum hydride and trimethyl-tin hydride. Metal alkyl-halides in which the alkyl radicals also contain 1 to 20 carbon atoms, such as ethyl-aluminum sesquichloride, diethyl-aluminum chloride and diisobutyl-aluminum chloride, are also suitable.

Finally, it is also possible to use organo-aluminum compounds obtained by reacting trialkyl-aluminums or dialky-aluminum hydrides in which the radicals contain 1 to 20 carbon atoms with diolefins containing 4 to 20 carbon atoms, and more particularly compounds called isoprenyl-aluminums.

The process of the invention can be applied to the polymerization of olefins possessing terminal unsaturation, the molecule of which contains 2 to 20 and preferably 2 to 6 carbon atoms, such as ethylene, propylene, 1-butene, 4-methyl-1-pentene and 1-hexene. It can also be applied to the copolymerization of these olefins with one another as well as with diolefins which preferably contain 4 to 20 carbon atoms. These diolefins can be unconjugated aliphatic diolefins such as 1,4-hexadiene, monocyclic diolefins such as 4-vinyl-cyclohexene, 1,3-divinyl-cyclohexane, 1,3-cyclopentadiene or 1,5-cyclooctadiene, alicyclic diolefins possessing an endocyclic bridge such as dicyclopentadiene or norbornadiene and conjugated aliphatic diolefins such as butadiene and isoprene.

The process of the invention can be applied particularly well to the manufacture of ethylene homopolymers and copolymers which contain at least 90 mol % and preferably 95 mol % of ethylene.

The polymerization can be carried out in accordance with any known process whatsoever, in solution or in suspension in a solvent or a hydrocarbon diluent or in the gas phase. In the case of the processes in solution or in suspension, solvents or diluents similar to those employed for washing the catalyst complex are used. These are preferably alkanes or cycloalkanes such as butane, pentane, hexane, heptane, cyclohexane, methylcyclohexane or mixtures of them. It is also possible to carry out the polymerization in the monomer or one of the monomers kept in the liquid state.

It is nevertheless preferred to carry out the polymerization in suspension. In effect, it is easier and more economical to treat suspensions of polymers with a high solids content than very viscous solutions obtained by the solution process. Furthermore, the very high viscosity of the latter makes it very delicate to control the polymerization temperature and, consequently, to control the melt-index of the polymer.

The polymerization pressure is generally between atmospheric pressure and 100 kg/cm$^2$, and preferably 50 kg/cm$^2$. The temperature is generally chosen between 20° and 200° C., and preferably between 60° and 120° C. The polymerization can be carried out continuously or discontinuously.

The organic compound and the catalyst complex can be added separately to the polymerization medium. They can also be brought into contact, at a temperature of between −40° and 80° C., for a period of time which can range up to 2 hours, before introducing them into the polymerization reactor. It is also possible to bring them into contact in several steps or to add a part of the organic compound before the reactor or to add several different organometallic compounds.

The total amount of organic compound employed is not critical. It is generally between 0.02 and 50 mmols per dm$^3$ of solvent, diluent or reactor volume, and preferably between 0.2 and 5 mmols/dm$^3$.

The amount of catalyst complex employed is decided as a function of the transition metal content of the complex. It is generally chosen so that the concentration is between 0.001 and 2.5, and preferably between 0.01 and 0.25, m(gram atom) of metal per dm$^3$ of solvent, diluent or reactor volume.

The ratio of the amounts of organic compound and catalyst complex is not critical either. It is generally chosen so that the ratio of organic compound to transition metal, expressed in mol/gram atom, is greater than 1 and preferably greater than 10.

The average molecular weight, and consequently the melt-index of the polymers manufactured according to the process of the invention can be adjusted by adding, to the polymerization mixture, one or more molecular weight regulators such as hydrogen, diethyl-zinc or diethyl-cadmium, alcohols or carbon dioxide.

The specific gravity of the homopolymers manufactured according to the process of the invention can also be adjusted by adding, to the polymerization mixture, an alkoxide of a metal from Groups IVa and Va of the Periodic Table. Thus, it is possible to manufacture polyethylenes of specific gravity intermediate between that of polyethylenes manufactured according to a high pressure process and that of conventional high density polyethylenes.

Among the alkoxides which are suitable for this adjustment, those of titanium and vanadium in which each of the radicals contains 1 to 20 carbon atoms are particularly effective. Among them, there may be mentioned $Ti(OCH_3)_4$, $Ti(OC_2H_5)_4$, $Ti[OCH_2CH(CH_3)_2]_4$, $Ti(OC_8H_{17})_4$ and $Ti(OC_{16}H_{33})_4$.

The process of the invention makes it possible to manufacture polyolefins with remarkably high yields. Thus, in the homopolymerization of ethylene, the yield expressed in grams of polyethylene per gram of catalyst complex employed commonly exceeds 3,000 and in many cases 10,000. The activity relative to the amount of transition metal present in the catalyst complex is also very high. In the homopolymerization of ethylene, also expressed in grams of polyethylene per gram of transition metal employed, it commonly exceeds 10,000 and in certain cases 100,000.

Because of this, the proportion of catalyst residues in the polymers manufactured according to the process of the invention is extremely low. More particularly, the proportion of residual transition metal is extremely low. Now, it is the transition metal derivatives which are harmful in the catalyst residues because of the colored complexes which they form with the phenolic anti-oxidants usually employed in polyolefins. This is why, in the conventional processes for the polymerization of olefins by means of transition metal derivatives, the polymers must have the catalyst residues which they contain removed from them, for example, by means of a treatment with alcohol. In the process of the invention, the proportion of harmful residues is so low that it is possible to economize by dispensing with the purification treatment which is an expensive operation both with regard to starting materials and energy and necessitates tying up considerable amounts of capital.

The polyolefins manufactured according to the process of the invention can be converted into finished objects according to any known techniques such as extrusion, extrusion-blowing, injection molding and the like. They can be used, for example, to manufacture objects for handling goods (boxes and bottle crates), containers (bottles), films, and tapes.

The invention will be further described in connection with the following examples of the practice of it which are given for purposes of illustration only and in which proportions are by weight unless clearly stated to the contrary.

EXAMPLES 1 to 6

The following reagents were used:
(1) "Commercial anhydrous" magnesium dichloride (MgCl$_2$) containing 17 mg of water per kg;
(2) titanium tetrabutylate Ti(O-n—C$_4$H$_9$)$_4$; and
(3) ethyl-aluminum dichloride Al(C$_2$H$_5$)Cl$_2$.

95 g of magnesium dichloride were added to variable amounts of titanium tetrabutylate. The mixture was heated at about 160° C. for 3 hours. It was found that the magnesium chloride dissolves at least partially in the titanium tetrabutylate.

The mixture was allowed to return to ambient temperature and then 2 l. of hexane and variable amounts of ethylaluminum dichloride, in the form of a solution in hexane of concentration 400 g/l., were added to it.

An exothermic reaction and formation of the catalyst complex, in the form of a precipitate, were observed. The mixture was then heated under reflux (about 70° C.) for 1 hour.

The catalyst complex was then filtered off and washed with hexane. It was then dried in vacuo at 70° C. until its weight remained constant.

Variable amounts of catalyst complex and 100 mg of triisobutyl-aluminum Al(C$_4$H$_9$)$_3$ were introduced into a 1.5 l. autoclave containing 500 ml. of hexane. The temperature of the autoclave was then raised to about 80° C. Ethylene under a partial pressure of 5 kg/cm$^2$ and hydrogen under a partial pressure of 2 kg/cm$^2$ was introduced.

Polymerization was carried out for 1 hour, with stirring, while keeping the total pressure constant by continuously adding ethylene. After 1 hour, the gas was released from the autoclave and the polyethylene which had been manufactured was collected.

Table I gives the conditions characteristic of each experiment as well as the results otained. The atomic ratio Ti/Mg represents the number of mols of titanium tetrabutylate employed per mol of magnesium chloride used. Because of the impurities which these reagents contain, it is accurate to ±10%. The ratio Al/Ti represents the number of mols of ethyl-aluminum dichloride employed per gram equivalent of titanium tetrabutylate. This ratio is also accurate to ±10%.

In Examples 2 and 5, the amount of triisobutyl-aluminum employed is 200 mg instead of 100 mg.

TABLE I

|  | Example 1 | Example 2 | Example 3 | Example 4 | Example 5 | Example 6 |
|---|---|---|---|---|---|---|
| Amount of Ti(OC$_4$H$_9$)$_4$ employed g | 170 | 170 | 340 | 340 | 680 | 680 |
| Atomic ratio Ti/Mg gram atom/gram atom | 0.5 | 0.5 | 1 | 1 | 2 | 2 |
| Amount of Al(C$_2$H$_5$)Cl$_2$ employed g | 318 | 635 | 318 | 635 | 318 | 635 |
| Ratio Al/Ti mol/gram equivalent | 1.25 | 2.5 | 0.63 | 1.25 | 0.31 | 0.63 |
| Elementary analysis of the catalyst complex |  |  |  |  |  |  |
| Magnesium mg/g | 112 | 118 | 93 | 111 | 60 | 48 |
| Titanium mg/g | 108 | 137 | 132 | 136 | 147 | 172 |
| Aluminum mg/g | 19 | 16 | 13 | 20 | 11 | 13 |
| Chlorine mg/g | 629 | 656 | 482 | 617 | 319 | 434 |
| Amount of catalyst complex employed mg | 7 | 10 | 11 | 6 | 24 | 5 |
| Amount of polyethylene produced g | 90 | 46 | 119 | 58 | 76 | 71 |
| Yield g of polyethylene/g of complex | 12,900 | 4,600 | 10,800 | 9,700 | 3,200 | 14,200 |
| Specific activity g of polyethylene/hour × g Ti × kg/cm$^2$ C$_2$H$_4$ | 23,800 | 6,700 | 16,400 | 14,200 | 4,300 | 16,500 |
| Melt-index of polyethylene (measured according to Standard Specification ASTM-D 1238-57 T) g/10 mins. | 0.31 | 0.12 | 0.26 | 0.21 | 1.29 | 0.88 |

The results given in Table I indicate that the yield of the catalyst complexes (weight of polymer produced per g of complex employed) and their specific activity (weight of polymer produced per hour, per g of metal from Groups IVa, Va and VIa employed and per kg/cm$^2$ of ethylene) pass through a maximum for values of the atomic ratio Ti/Mg between 0.05 and 2.5 gram atom/gram atom and values of the ratio Al/Ti between 0.5 and 1.5 mol/gram equivalent.

EXAMPLES 7 and 8

The same reagents as in Examples 1 to 6 were used, and in addition:
(4) Aluminum tributylate Al(OC$_4$H$_9$)$_3$.

95 g of magnesium chloride were added to a mixture of 246 g of aluminum tributylate and 34 g of titanium tetrabutylate. The atomic ratio Ti/Mg thus had a value of 0.1 gram atom/gram atom to within about ±10%.

This mixture was heated to about 160° C. for 6 hours. It was then allowed to cool to ambient temperature. A solid was obtained which was finely ground.

The solid thus ground was suspended in about 750 ml. of hexane and variable amounts of ethyl-aluminum dichloride, in the form of a solution in hexane of concentration 400 g/l., were added gradually.

An exothermic reaction was observed. The mixture was then heated under reflux (about 70° C.) for 1 hour.

The catalyst complex thus formed was then filtered off and washed with hexane. It was then dried in vacuo at 70° C. until its weight remained constant.

Variable amounts of this catalyst complex and 200 mg of triisobutyl-aluminum were introduced into a 1.5 l. autoclave containing 500 ml. of hexane. The temperature of the autoclave was then raised to about 85° C.

Ethylene under a partial pressure of 10 kg/cm² and hydrogen under a partial pressure of 4 kg/cm² were introduced.

Polymerization was carried out for 1 hour, with stirring, while keeping the total pressure constant by continuously adding ethylene. After 1 hour, the gases were released from the autoclave and the polyethylene which has been manufactured was collected.

Table II gives the conditions characteristic of each experiment as well as the results obtained. The ratio Al/Al+Ti is the ratio of the amount of ethyl-aluminum dichloride used, expressed in mols, to the total amount of titanium tetrabutylate and aluminum tributylate employed, expressed in gram equivalents.

TABLE II

|  |  | Example 7 | Example 8 |
|---|---|---|---|
| Amount of Al(C₂H₅)Cl₂ employed | g | 318 | 635 |
| Ratio Al/Ti + Al mol/gram equivalent |  | 0.74 | 1.47 |
| Elementary analysis of the catalyst complex |  |  |  |
| Magnesium | mg/g | 142 | 80 |
| Titanium | mg/g | 16 | 17 |
| Aluminum | mg/g | 79 | 154 |
| Chlorine | mg/g | 520 | 557 |
| Amount of catalyst complex employed | mg | 5 | 5 |
| Amount of polyethylene produced | g | 88 | 82 |
| Yield g of polyethylene/g of complex |  | 17,600 | 16,400 |
| Specific activity |  |  |  |
| g of polyethylene/hour × g Ti × kg/cm² C₂H₄ |  | 110,000 | 96,400 |
| Melt-index of the polyethylene g/10 mins. |  | 1.04 | 0.27 |

EXAMPLE 9

The same reagents were used as in Example 1 to 6 except that the magnesium dichloride was replaced by magnesium hydroxychloride [Mg(OH)Cl] obtained by heating magnesium dichloride tetrahydrate at 290° C. for 22 hours.

67 g of magnesium hydroxychloride were added to 340 g of titanium tetrabutylate. The mixture was heated at about 160° C. for 6 hours. The atomic ratio Ti/Mg in the mixture was 1 gram atom/gram atom to about ±10%.

The mixture was allowed to return to ambient temperature and then 1,200 ml. of hexane and 635 g of ethyl-aluminum dichloride, in the form of a solution in hexane of concentration 400 g/l., were added to it. The ratio Al/Ti was 1.25 mol/gram equivalent to about ±10%. The preparation of the catalyst complex was finally completed as in Examples 1 to 6.

A polymerization experiment was carried out under the same conditions as in Examples 1 to 6. 5 mg of catalyst complex, the elementary analysis of which was as follows:

| Magnesium: | 61 g/kg |
|---|---|
| Titanium: | 155 g/kg |
| Aluminum: | 28 g/kg |
| Chlorine: | 552 g/kg | were employed.

64 g of polyethylene with a melt-index of 0.16 g/10 mins. were obtained. The yield was thus 12,800 g of polyethylene/g of catalyst complex and the specific activity expressed in g of polyethylene/hour×g Ti×kg/cm² C₂H₄ was 16,500.

EXAMPLE 10

The same reagents were used as in Examples 1 to 6 except that the magnesium dichloride was replaced by analytically pure calcium dichloride (CaCl₂).

111 g of calcium dichloride were added to 340 g of titanium tetrabutylate. The mixture was heated at about 125° C. for 6 hours. The atomic ratio Ti/Ca in the mixture was 1 gram atom/gram atom to about ±10%.

The mixture was allowed to return to ambient temperature and then 1,750 ml. of hexane and 635 g of ethyl-aluminum dichloride, in the form of a solution in hexane of concentration 400 g/l., were added to it. The ratio Al/Ti was 1.25 mol/gram equivalent to about ±10%. The preparation of the catalyst complex was finally completed as in Examples 1 to 6.

A polymerization experiment was carried out under the same conditions as in Examples 7 and 8. 11 mg of catalyst complex, the elementary analysis of which was as follows:

| Calcium: | 48 g/kg |
|---|---|
| Titanium: | 70 g/kg |
| Aluminum: | 56 g/kg |
| Chlorine: | 333 g/kg | were employed.

32 g of polyethylene with a melt-index of 0.11 g/10 mins. were obtained. The yield was, thus, 2,900 g of polyethylene/g of catalyst complex and the specific activity expressed in g of polyethylene/hour×g Ti×kg/cm² was 4,100.

EXAMPLE 11

The same reagents are used as in Example 4 except that the titanium tetrabutylate is replaced by zirconium tetrabutylate [Zr(OC₄H₉)₄]. The amount of the latter employed was 383 g.

The catalyst complex was prepared under the same conditions as the complex used in Example 4.

A polymerization experiment was carried out under the same conditions as in Examples 7 and 8. 12 mg of catalyst complex, the elementary analysis of which was:

| Magnesium: | 71 g/kg |
|---|---|
| Zirconium: | 223 g/kg |
| Aluminum: | 29 g/kg |
| Chlorine: | 493 g/kg | were employed.

21 g of polyethylene, which has a melt-index measured under a heavy load (21.6 kg) of 1.08 g/10 min., were obtained. The yield was thus 1,750 g of polyethylene/g of catalyst complex.

EXAMPLE 12

A polymerization experiment was carried out with the catalyst complex prepared according to Example 6. This experiment was carried out under the same conditions as that of Example 6 except that the triisobutyl-aluminum is replaced by trimethyl-aluminum [Al(CH$_3$)$_3$]. The amount of the latter employed was 72 mg. 7 mg of catalyst complex were used.

102 g of polyethylene, which had a melt-index of 1.43 g/10 mins., were obtained. The yield was thus 14,600 g of polyethylene/g of catalyst complex.

EXAMPLE 13

The same reagents were used as in Examples 1 to 6 except that the "commercial anhydrous" magnesium dichloride was replaced by hydrated magnesium chloride. The latter was prepared by gradually heating magnesium dichloride tetrahydrate MgCl$_2$.4H$_2$O up to 205° C. over the course of 3.5 hours. A magnesium chloride containing 0.86 mol of water per gram atom of magnesium was obtained.

The catalyst complex was prepared under the same conditions as those of Example 4. 111 g of hydrated magnesium chloride were employed.

A polymerization experiment was carried out under the same conditions as in Example 4. 6 mg of catalyst complex, the elementary analysis of which was:

| | |
|---|---|
| Magnesium: | 71 g/kg |
| Titanium: | 149 g/kg |
| Aluminum: | 41 g/kg |
| Chlorine: | 514 g/kg | was employed.

74 g of polyethylene, which had a melt-index of 0.19 g/10 mins., were obtained. The yield was thus 12,300 g of polyethylene/g of catalyst complex and the specific activity expressed in g of polyethylene/hour×g Ti×kg/cm$^2$ C$_2$H$_4$ was 17,000.

EXAMPLE 14

The same reagents were used as in Examples 1 to 6 except that the "commercial anhydrous" magnesium dichloride was replaced by anhydrous manganese chloride. The analytically pure product was used directly.

The catalyst complex was prepared under the same conditions as those of Example 4. 126 g of manganese chloride were employed.

A polymerization experiment was carried out under the same conditions as those of Examples 7 and 8.

12 mg of catalyst complex were employed.

92 g of polyethylene, which had a melt-index of 0.31 g/10 mins., were obtained. The yield was thus 7,660 g of polyethylene/g of catalyst complex.

EXAMPLE 15

The same reagents were used as in Examples 1 to 6 except that the "commercial anhydrous" magnesium dichloride was replaced by analytically pure anhydrous zinc chloride which was used directly.

The catalyst complex was prepared under the same conditions as those of Example 4. 136 g of zinc chloride were employed.

A polymerization experiment was carried out under the same conditions as those of Examples 7 and 8.

105 mg of catalyst complex were employed. 55 g of polyethylene, which had a melt-index of 0.38 g/10 mins., were obtained. The yield was thus 520 g of polyethylene/g of catalyst complex.

EXAMPLE 16

The same reagents were used as in Examples 1 to 6 except that the commercial anhydrous magnesium dichloride was replaced by magnesium fluoride. The latter was prepared by reacting gaseous HF with hydromagnesite.

The catalyst complex was prepared under the same conditions as those of Example 4. 62 g of magnesium fluoride were employed.

A polymerization experiment was carried out under the same conditions as those of Examples 7 and 8.

12 mg of catalyst complex were employed. 52 g of polyethylene, which had a melt-index of 0.17 g/10 mins., were obtained. The yield was thus 4,340 g of polyethylene/g of catalyst complex.

EXAMPLE 17

The same reagents were used as in Examples 1 to 6 except that the titanium tetrabutylate was replaced by vanadyl butylate [VO(OBu)$_3$].

The amount of the latter employed was 238 g.

The catalyst complex was prepared under the same conditions as those of Example 4.

A polymerization experiment was carried out under the same conditions as those of Examples 7 and 8, except that the hydrogen was introduced under a partial pressure of 1 kg/cm$^2$.

29 mg of catalyst complex were employed. 42 g of polyethylene, which had a melt-index of 0.13 g/10 mins., were obtained. The yield was thus 1,450 g of polyethylene/g of catalyst complex.

EXAMPLE 18

The same reagents were used as in Examples 1 to 6 except that the "commercial anhydrous" magnesium chloride was replaced by ethyl-magnesium chloride [Mg(C$_2$H$_5$)Cl].

This product was employed in the form of a solution in diethyl ether of concentration 52 g/l. and was added to a solution of Ti(OC$_4$H$_9$)$_4$ in the same solvent of concentration 500 g/l., in such a way that the atomic ratio Ti/Mg in the mixture was 1 gram atom/gram atom to about ±10%.

An exothermic reaction and the formation of a precipitate was observed. The mixture was allowed to return to ambient temperature and then the precipitate was filtered off, the ether was removed and the solid was dried in vacuo at 70° C. to constant weight. The solid thus obtained was suspended in 200 ml. of hexane and the preparation of the catalyst complex was continued as mentioned in Example 4.

A polymerization experiment was carried out under the same conditions as those of Examples 7 and 8.

21 mg of catalyst complex were employed. 67 g of polyethylene, which had a melt-index of 1.31 g/10 mins., were obtained. The yield was thus 3,200 g of polyethylene/g of catalyst complex.

EXAMPLE 19

A catalyst complex was prepared with the same reagents and under the same conditions as in Example 18.

Using 22 mg of this catalyst complex, a polymerization experiment was carried out under the same conditions as those of Examples 7 and 8, except that 120 mg of diethyl-aluminum chloride were used as activator.

23 g of polyethylene, which had a melt-index of 0.32 g/10 mins., were obtained. The yield was thus 1,050 g of polyethylene/g of catalyst complex.

While the invention has been described in connection with a preferred embodiment, it is not intended to limit the invention to the particular form set forth, but, on the contrary it is intended to cover such alternatives, modifications, and equivalents as may be included within the spirit and scope of the invention as defined by the appended claims.

What is claimed is:

1. A solid catalytic complex comprising the solid reaction product formed by reacting together
   (A) at least one reagent selected from magnesium dichloride and magnesium dichloride hydrate; with
   (B) at least one reagent which is a halogen-free titanium alkoxide containing $C_1$-$C_{20}$ organic radicals bonded to the metal via oxygen; and with
   (C) at least one reagent which is an alkyl aluminium chloride having the general formula $AlR'_n X_{3-n}$ in which $R'$ is a hydrocarbon radical containing 1 to 20 carbon atoms, X is a chloride and n is any number such that $1 \leq n \leq 2$.

2. The solid catalyst complex of claim 1, wherein the halogen-free organic oxygen-compound corresponds to the general formula $(TO_x (OR)_y)_m$ wherein T is titanium, R is an organic radical containing 1 to 20 carbon atoms, x and y are any number such that $x \geq 0$ and $y > 0$ and are compatible with the valency of T, and m is an integer.

3. The solid catalyst complex of claim 2 wherein the reactants further include a halogen-free organic oxygen-compound of a metal selected from aluminum and silicon containing $C_1$-$C_{20}$ organic radicals bonded to the metal via oxygen.

4. The solid catalyst complex of claim 2 wherein R is a hydrocarbon radical containing 1 to 10 carbon atoms, x is such that $0 \leq x \leq 1$, m is such that $1 \leq m \leq 6$, and the amount of halogen-free titanium alkoxide is such that the atomic ratio of the total amount of titanium to the total amount of magnesium is between 0.01 and 100 gram atom/gram atom.

5. The solid catalyst complex of claim 4 wherein the reactants further include a halogen-free organic oxygen-compound of a metal selected from aluminum and silicon containing $C_1$-$C_{20}$ organic radicals bonded to the metal via oxygen.

6. A catalyst for the polymerization and copolymerization of alpha-olefins comprising an organic compound of a metal selected from Groups Ib, IIa, IIb, IIIb, and IVb of the Periodic Table and the solid catalyst complex of claim 2.

7. A catalyst for the polymerization and copolymerization of alpha-olefins comprising an organic compound of a metal selected from Groups Ib, IIa, IIb, IIIb, and IVb of the Periodic Table and the solid catalyst complex of claim 3.

8. A catalyst for the polymerization and copolymerization of alpha-olefins comprising an organic compound of a metal selected from Groups Ib, IIa, IIb, IIIb, and IVb of the Periodic Table and the solid catalyst complex of claim 4.

9. A catalyst for the polymerization and copolymerization of alpha-olefins comprising an organic compound of a metal selected from Groups Ib, IIa, IIb, IIIb, and IVb of the Periodic Table and the solid catalyst complex of claim 5.

10. The process for the polymerization and copolymerization of alpha-olefins comprising carrying out the polymerization in the presence of the catalyst of claim 6.

11. The process for the polymerization and copolymerization of alpha-olefins comprising carrying out the polymerization in the presence of the catalyst of claim 7.

12. The process for the polymerization and copolymerization of alpha-olefins comprising carrying out the polymerization in the presence of the catalyst of claim 8.

13. The process for the polymerization and copolymerization of alpha-olefins comprising carrying out the polymerization in the presence of the catalyst of claim 9.

14. A catalyst for the polymerization and copolymerization of alpha-olefins comprising a tri ($C_1$-$C_{20}$ alkyl) aluminum and the solid catalytic complex of claim 2.

15. The process for the polymerization and copolymerization of alpha-olefins comprising carrying out the polymerization in the presence of the catalyst of claim 14.

16. A solid catalytic complex comprising the solid reaction product formed by reacting together
   (A) at least one reagent selected from magnesium dichloride and magnesium dichloride hydrate; with
   (B) at least one reagent which is a halogen-free titanium alkoxide containing $C_1$-$CHd\ 20$ organic radicals bonded to the metal via oxygen; and with
   (C) at least one reagent which is an alkyl aluminum chloride having the general formula $AlR_n X_{3-n}$ in which R is a hydrocarbon radical containing one to twenty carbon atoms, X is a chloride and n is any number such that $1 \leq n \leq 2$,
said reaction being carried out by contacting reagent (A) with reagent (B) and then adding reagent (C) thereto in amounts such that the atomic ratio of titanium metal to magnesium metal is between 0.01 and 100 gram-atom/gram-atom, and the amount of alkyl aluminum halide is such that the ratio of the total amount of alkyl aluminum halide to the amount of titanium metal is between 0.1 and 10 moles/gram equivalent.

17. A solid catalytic complex comprising the solid reaction product formed by reacting together
   (A) at least one magnesium dichloride hydrate; with
   (B) at least one reagent which is halogen-free titanium alkoxide containing $C_1$-$C_{20}$ organic radicals bonded to the metal via oxygen; and with
   (C) at least one reagent which is an alkyl aluminum chloride having the general formula $AlR_n X_{3-n}$ in which R is a hydrocarbon radical containing one to twenty carbon atoms, X is a chloride and n is any number such that $1 \leq n \leq 2$,
said reaction being carried out by contacting reagent (A) with reagent (B) and then adding reagent (C) thereto in amounts such that the atomic ratio of titanium metal to magnesium metal is between 0.025 and 5 gram-atom/gram-atom and the amount of alkyl aluminum chloride is such that the ratio of the total amount of alkyl aluminum chloride to the amount of titanium metal is between 0.25 and 2.5 moles/gram equivalent.

* * * * *